INVENTORS
BRUNO B. JOHANNSEN
JOHN C. THOMPSON

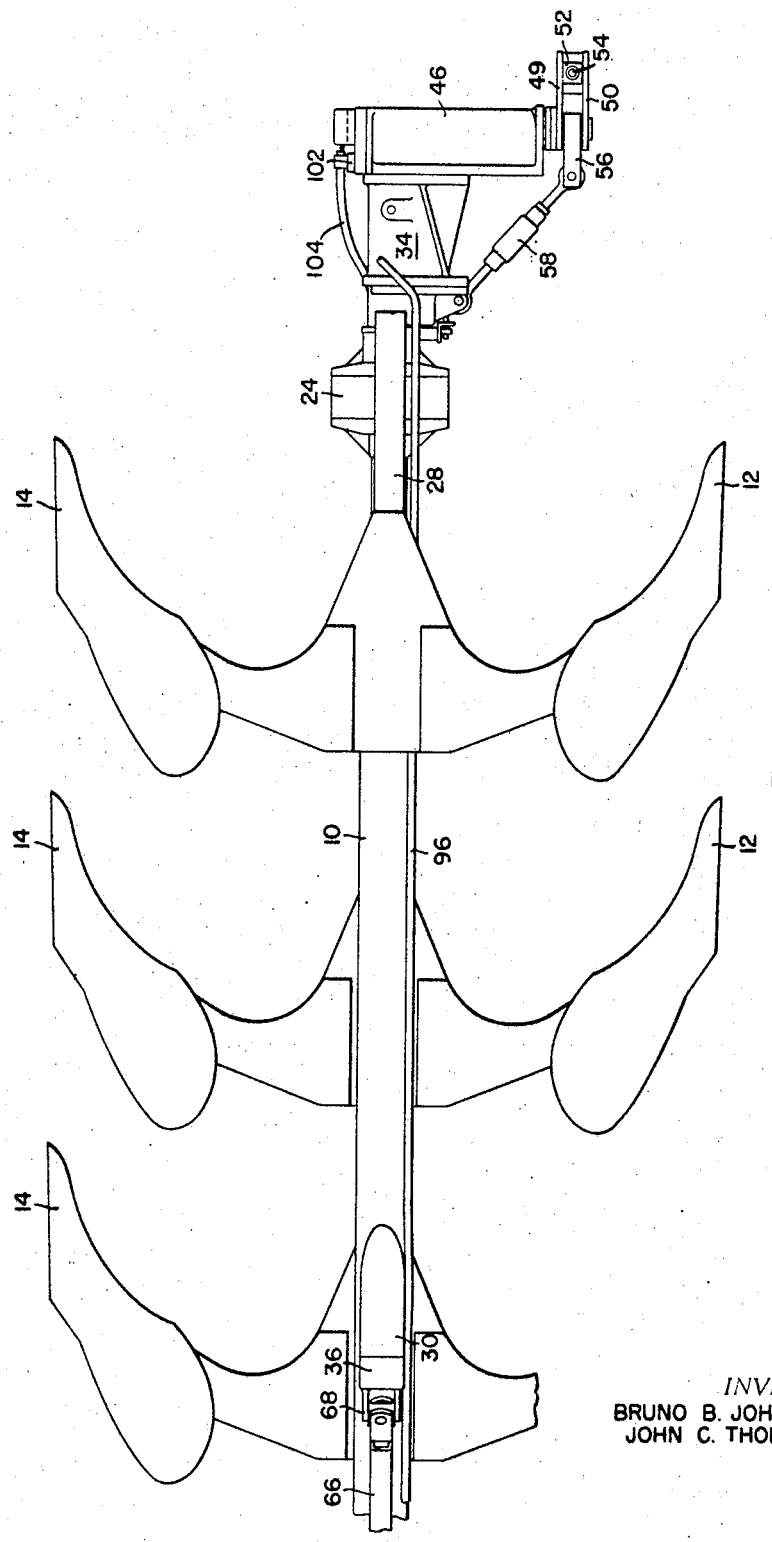

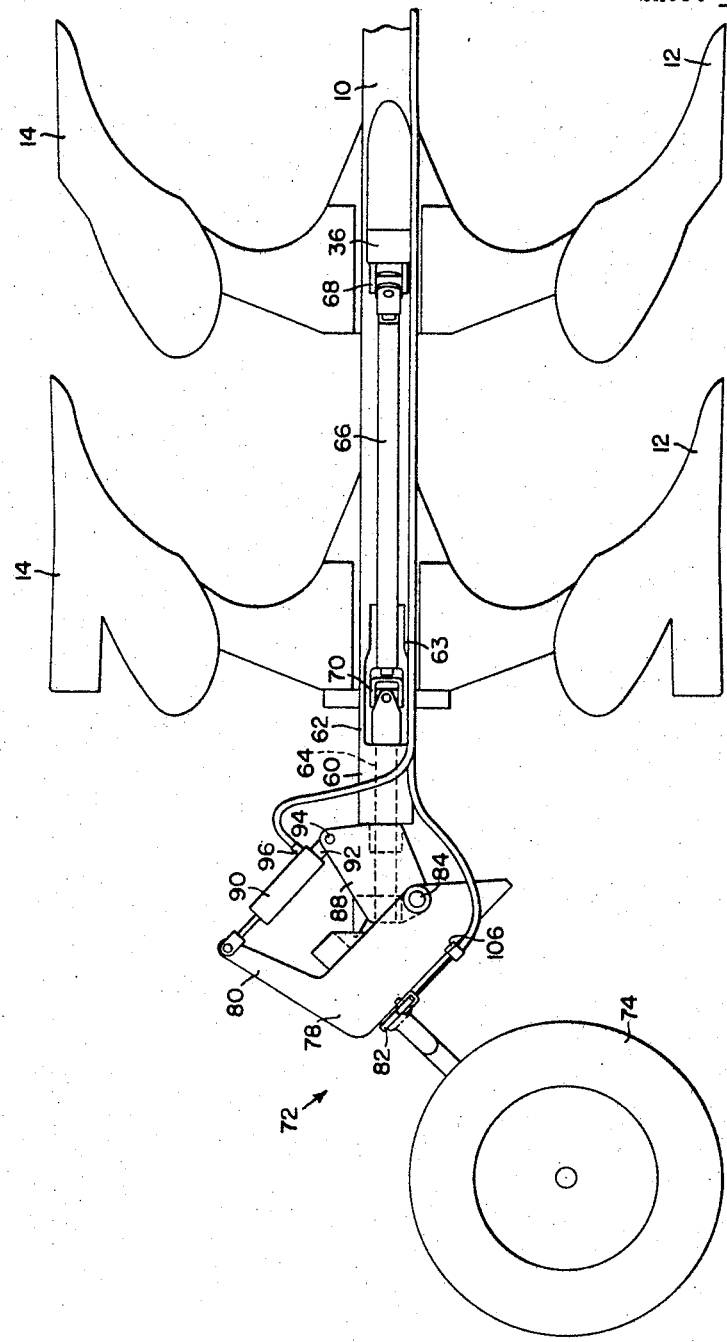

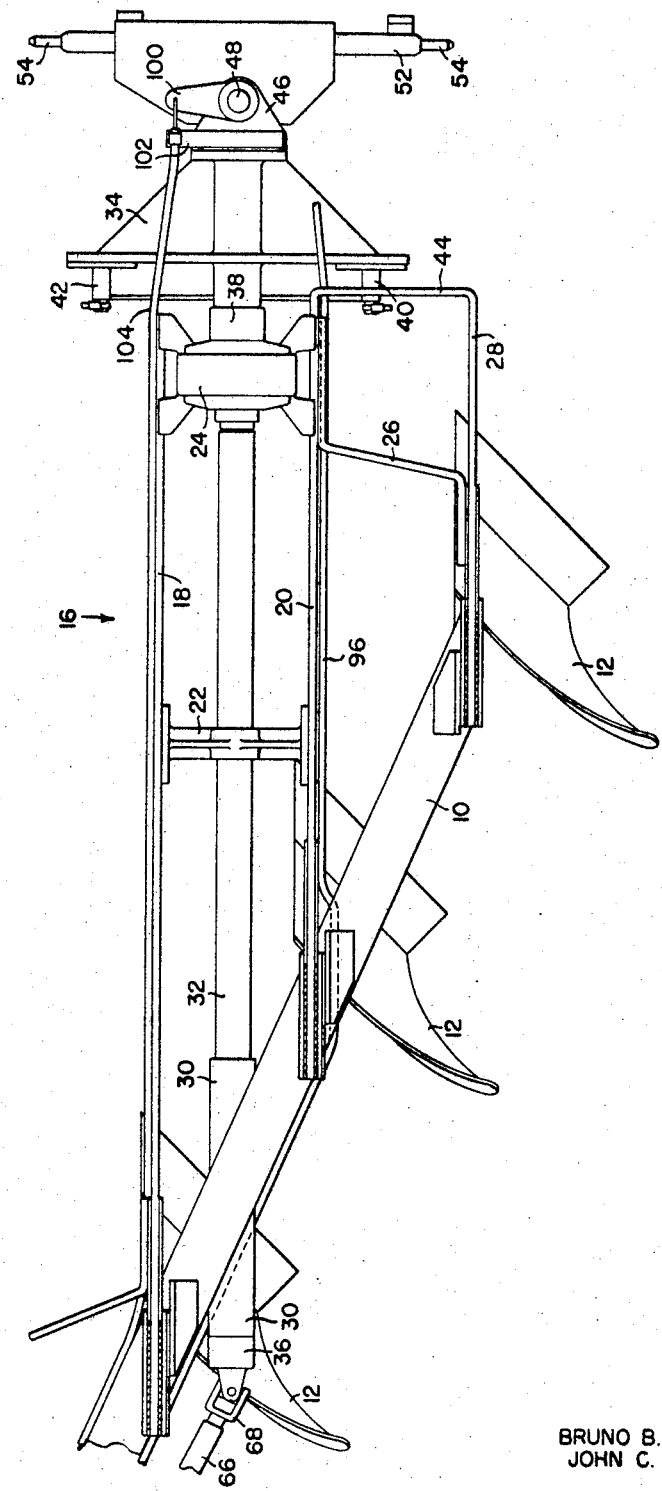

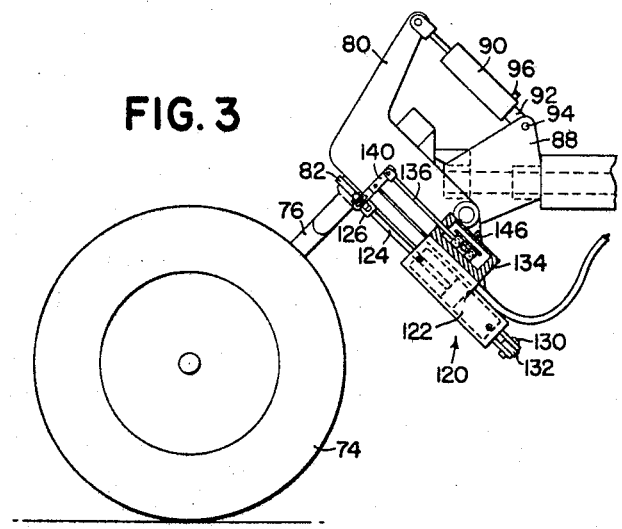
FIG. 3
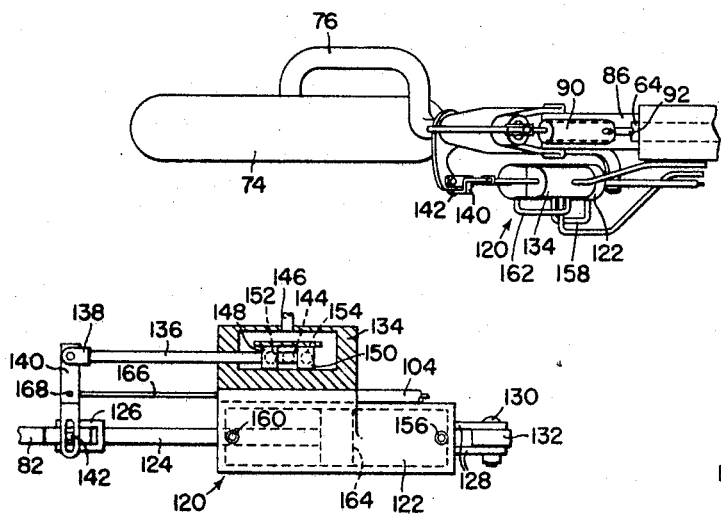
FIG. 4
FIG. 5
INVENTORS
BRUNO B. JOHANNSEN
JOHN C. THOMPSON

United States Patent Office 3,428,136
Patented Feb. 18, 1969

3,428,136
TWO-WAY PLOW
Bruno B. Johannsen, Moline, and John C. Thompson, East Moline, Ill., assignors to Deere & Company, Moline, Ill., a corporation of Delaware
Filed July 1, 1965, Ser. No. 468,823
U.S. Cl. 172—285
Int. Cl. A01b 69/08, 3/34, 5/08
4 Claims

ABSTRACT OF THE DISCLOSURE

A semi-mounted roll-over plow with a steerable rear furrow wheel. A push-pull cable controls a hydraulic cylinder which causes the rear wheel to turn. The cable is moved in response to turning of the propelling tractor relative to the frame of the plow.

---

The present invention relates generally to agricultural implements, and more particularly to an improved two-way or roll-over semi-mounted moldboard plow.

It is an object of the present invention to provide in a two-way semi-mounted moldboard plow means to steer the rear furrow wheel in response to relative turning movement between the plow and the tractor which propels the plow.

One object of the present invention is to provide a two way semi-mounted moldboard plow having a self-contained mechanical structure to effectuate steering of the rear furrow wheel. More specifically, it is an object to provide a push-pull cable which interconnects either a relatively stable forward portion of the plow or the tractor with the swingable portion of the plow to effectuate steering when the tractor is turning relative to the plow.

Another object of the present invention is to provide push-pull cable means for steering in which hydraulic force multiplying means are employed.

These and other objects and advantages of the present invention will be apparent to those skilled in the art after a consideration of the following detailed description, taken in conjunction with the accompanying drawings, in which the preferred form of this invention is illustrated.

FIGS. 1A and 1B are front and rear side elevation views, respectively, of a two-way semi-mounted moldboard plow incorporating one form of the present invention.

FIGS. 2A and 2B are front and rear plan views, respectively, of the plow shown in FIGS. 1A and 1B.

FIG. 3 is a side elevation view of the rear portion of a semi-integral two-way moldboard plow in which hydraulic force multiplying means are employed to aid in steering of the steerable furrow wheel.

FIG. 4 is a plan view of the structure shown in FIG. 3.

FIG. 5 is a sectional view of the hydraulic force multiplying means shown in FIGS. 3 and 4.

Figure 2B:
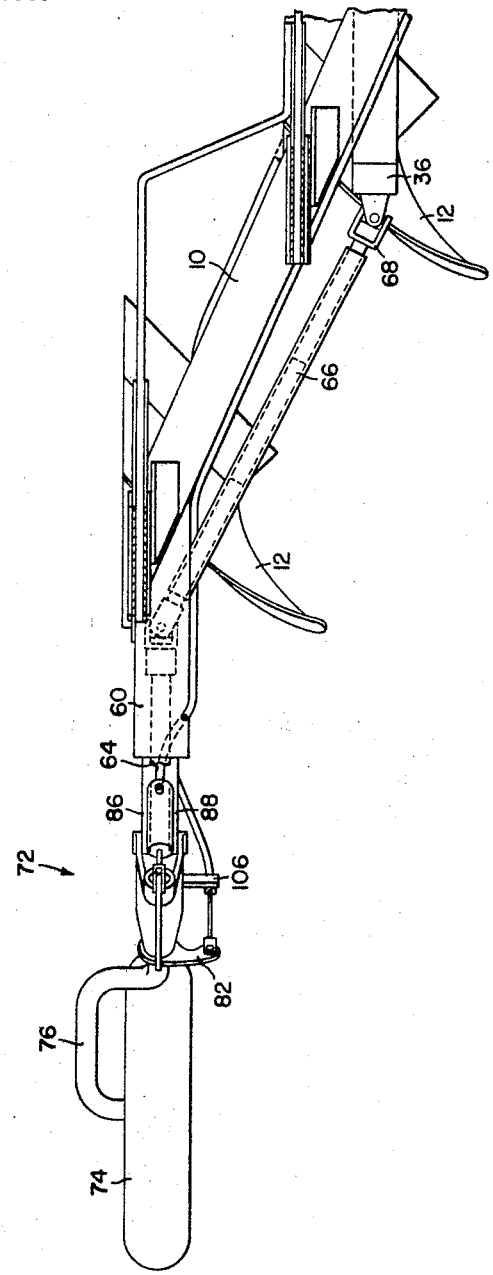

The two-way plow of this invention is provided with an obliquely extending main frame member 10 to which are secured a plurality of right-hand and left-hand plow bottoms, 12 and 14, respectively. Rigidly secured to the forward side of the main frame member 10 is a truss frame construction which is indicated generally at 16 (FIG. 2A).

The truss frame construction includes first and second fore-and-aft extending frame bars 18 and 20 which are rigidly secured in a conventional manner at their rear ends to the main frame member 10. Interconnecting intermediate portions of the frame bars 18 and 20 is a bearing bracket 22. Secured to the forward ends of the frame bars 18 and 20 is a vane cylinder 24 which has substantially the same form as that shown in U.S. Patent No. 3,007,531 to Silver et al., issued Nov. 7, 1961. Third and fourth frame bars, 26 and 28, respectively, are secured at one end to one side of the vane cylinder 24, the rearward ends of the third and fourth frame bars being in turn secured to the forward end of the obliquely extending main frame member 10.

A midportion of the main frame bar 10 is provided with fore-and-aft alined elliptical openings in which a first sleeve member 30 is rigidly secured. Disposed within the first sleeve member 30 is a first fore-and-aft extending shaft 32 whose intermediate portion is disposed within the bearing bracket 22, a forward portion being disposed within the vane cylinder 24 for relative rotational movement therein, and the forward end of the first shaft 32 being non-rotatably secured within the head structure 34. The rear end of the first shaft 32 is provided with an enlarged cylindrical portion 36 which is adapted to abut against the rear end of the first sleeve member 30. Similarly, the forward portion of the first shaft is provided with a second enlarged cylindrical portion 38 which abuts against the forward end of the vane cylinder 24.

The head structure to which the first sleeve member is rigidly secured is provided with right- and left-hand stops 40, 42, which are adapted to be contacted by the transverse portion 44 of the fourth frame bar 28 to limit rotational movement of the truss frame construction. The forward end of the head structure 34 carries a generally vertically extending sleeve member 46 that receives a pivot post 48. The lower end of the pivot post 48 is rigidly secured to a hitch cross bar plate assembly having upper and lower plates 49, 50 to which is secured a cross bar 52 having reduced ends 54 that may be secured to the lower draft links of a tractor. A link 56 is mounted on the pivot post 48 and extends to the rear where it is in turn secured to an adjustable brace 58 in the form of a turnbuckle.

A second sleeve member 60 is provided with forwardly extending upper and lower plate portions 62 and 63 which are rigidly secured to the rear end of the obliquely extending main frame member 10. A second shaft 64 is held within the sleeve member for relative rotational movement. The forward end of the second shaft 64 is secured to the rear end of the first shaft by means of a third shaft 66 which carries front and rear universal joint assemblies 68 and 70, respectively, which are in turn secured to the first and second shafts.

A rear wheel assembly indicated generally at 72 is carried by the rear end of the shaft 64. To this end the rear furrow wheel 74 is carried by a crank axle 76 which has an outwardly extending arm 82 and whose upper end is rotatably supported within a sleeved member 78 having an upwardly extending arm 80. The sleeved member 78 is pivotally supported about a transverse pivot 84 which is carried by a lower rear portion of right- and left-hand plates 86, 88 which are rigidly secured in turn to the second shaft 64. A cylinder 90 which is provided with an extension 92 is pivotally supported at one end on pivot pin 94 by an upper trunnion portion of the right- and left-hand plates 86 and 88, and is also pivotally secured at the other end to one end of the upwardly extending arm 80. As will be obvious, actuation of the cylinder 90 will cause corresponding movement of the furrow wheel 74.

When the vane cylinder 24 is hydraulically actuated to rotate the frame 16 about the shaft 32, the second sleeve member 60 will swing from the left, as viewed in FIGS. 2A and 2B to the right of the first fore-and-aft extending shaft 32.

The hydraulic cylinder 90 which is employed to raise the rear end of the plow is provided with a fluid line 96 which is secured along the main frame member 10 of the plow and interconnected at its forward end with a hydraulic outlet on a tractor.

A normally transversely extending arm 100 is fixedly secured to the upper end of the pivot post 48. An outwardly extending arm 102 is also provided, this arm being rigidly secured to the head structure 34. It should be noted that as the tractor that propels the plow turns that the arm 100 will swing towards or away from the arm 102. This relative movement during turning is employed to steer the rear furrow wheel. Thus turning movement of the tractor to the right (when viewed from the rear of the plow) causes the arm 100 to move away from the arm 102. This relative movement is transmitted by means of a push-pull cable 104 to the outwardly extending arm 82 on the axle 76. The sheath of the push-pull cable is anchored at its rear end to an outwardly extending arm 106.

Since the forces transmitted by the push-pull cable are relatively high, it is expedient in certain applications to employ force multiplying means to permit the use of push-pull cables of lower force transmitting capacity. To this end hydraulic force transmitting means is employed in which a two-way hydraulic motor and servo-valve indicated generally at 120 (FIG. 3) are mounted on the member 78. The hydraulic force multiplying assembly consists of a two-way hydraulic motor 122 whose piston rod 124 is provided with a yoke 126 that is pivotally secured to the outwardly extending arm 82 on the axle 76. The opposite end of the motor 122 is provided with spaced apart ears 128 that are pivotally secured by means of a pivot pin 130 to an outwardly extending arm 132 which is secured to the lower portion of the member 78. A servo-valve 134 is carried above the motor 122 and is provided with a valve stem 136 whose yoke end 138 is pivotally secured to the upper end of a link 140 whose lower end is provided with an elongated slot (no number) that receives the pivot pin 142. The servo-valve 134 is provided with an inlet 144 and an outlet fitting 146. The valve stem 136 is provided with lands 148 and 150 which normally cover control ports 152 and 154 within the valve. Disposed between the servo-valve and the two-way hydraulic motor 122 is an anchor for a push-pull cable assembly 104. The control port 152 is connected with one port 156 of the hydraulic motor 122 by means of a fluid line 158 and the other port 154 is connected with a second port 160 in the hydraulic motor by means of a second fluid line 162. The operation of this form of the plow of the present invention is as follows: When plowing forwardly the piston 164 is disposed substantially midway between the ends of the motor 122 and the ports 152 and 154 are covered by the lands 148 and 150 respectively as can be seen in FIG. 5. If the tractor turns to the left, the core 166 of the push-pull cable assembly 104 will be moved to the rear. This rearward movement will cause the link 104 to swing about the pivot pin 142 causing rearward movement of the valve stem 136. When the valve stem 136 has been moved to the rear, the fluid under pressure which is normally held between the lands 148 and 150 is permitted to discharge through the port 152 and will then cause the piston 164 to move to the left. The fluid held to the left of the piston 164 will then escape to the reservoir through the conduit 162, port 154 and discharge outlet 146. As the piston and piston rod 124 move towards the left, assuming that no additional movement of the push-pull cable takes place, the link will then pivot about pin 168 to cause the valve stem 136 to move back to the position normally occupied. The above described procedure will cause the arm 82 to be moved to the rear thus effecting a turning and positioning of the wheel 74. When the tractor turns in the opposite direction, the reverse procedure will take place.

While the preferred structures in which the principles of the present invention have been incorporated are shown and described above, it is to be understood that the invention is not to be limited to the particular details, shown and described above, but that, in fact, widely different means may be employed in the practice of the broader aspects of the invention.

What is claimed is:
1. In combination with a tractor having lower draft links, a semi-integral two-way moldboard plow having a rotatable frame, a forwardly extending hitch frame adapted to be connected to the draft links of the tractor, said hitch mechanism having a vertically extending post about which a head structure is swingably secured, a first fore-and-aft extending shaft secured at its forward end to the head structure and rotatable within the frame, said shaft being disposed generally along the fore-and-aft center line of the tractor, vane cylinder means acting between said first shaft and the frame to effect rotation of the frame about the shaft upon actuation of the vane cylinder, a second shaft generally parallel to the first shaft but disposed to one side of the fore-and-aft center line, a third shaft interconnecting the first and second shafts by means of universal joint connections, a rear furrow wheel carried to the rear of the second shaft, means to cause relative turning movement of the rear furrow wheel with respect to the second shaft, said means comprising a generally vertically extending axle shaft, an arm secured to an upper portion of the axle shaft and extending outwardly therefrom, a second arm mounted upon the post at the forward end of the plow, and push-pull cable means interconnecting the two arms, said push-pull cable means including anchors rigidly secured to the frame of the plow.

2. In a semi-mounted two-way moldboard plow having frame means upon which right- and left-hand bottoms are mounted, a forward hitch device securable to a propelling tractor, said hitch device having a vertically disposed pivot post about which the frame means may turn as the tractor turns, roll-over means operative to dispose one or the other of the right- and left-hand bottoms in the desired plowing position, and a steerable rear furrow wheel carried by the frame means which is laterally offset from the longitudinal center line of the tractor hitch mounting, the combination therewith of means to steer the rear furrow wheel in response to turning movement of the tractor relative to the frame means including a first lever arm mounted on the pivot post, a second lever arm on the rear furrow wheel, extensible and retractable hydraulic means interconnected between said frame means and said second lever arm and operable upon extension and retraction to turn said wheel, and a push-pull cable, one end of which is connected to the first lever, and the other end of which is interconnected with the hydraulic means and operable to cause said hydraulic means to extend or retract as the frame turns relative to the tractor.

3. The combination set forth in claim 2 in which a mechanical feedback mechanism is interconnected with the push-pull cable and the extensible and retractable hydraulic means, said feedback mechanism being operable to stop extension or retraction of the hydraulic means upon attainment of the desired degree of turning indicated by the position of the push-pull cable.

4. The combination set forth in claim 2 in which the extensible and retractable hydraulic means includes a double acting hydraulic motor and a three-position servo-valve.

References Cited

UNITED STATES PATENTS

| | | | |
|---|---|---|---|
| 2,879,853 | 3/1959 | Seng | 172—226 |
| 3,035,537 | 5/1962 | Smith | 280—442 X |
| 3,061,020 | 10/1962 | Mannheim | 172—285 |

FOREIGN PATENTS 114,156    10/1918    Great Britain.

ABRAHAM G. STONE, *Primary Examiner.*

JIMMIE R. OAKS, *Assistant Examiner.*

U.S. Cl. X.R.

172—225